US006604407B2

(12) United States Patent
Kano et al.

(10) Patent No.: US 6,604,407 B2
(45) Date of Patent: Aug. 12, 2003

(54) LEAK CHECK APPARATUS FOR FUEL VAPOR PURGE SYSTEM

(75) Inventors: Masao Kano, Gamagori (JP); Nobuhiko Koyama, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/114,458

(22) Filed: Apr. 3, 2002

(65) Prior Publication Data

US 2002/0139173 A1 Oct. 3, 2002

(30) Foreign Application Priority Data

Apr. 3, 2001 (JP) ....................................... 2001-104999

(51) Int. Cl.[7] ................................................ G01M 3/04
(52) U.S. Cl. ....................................... 73/49.7; 73/118.1
(58) Field of Search ................................ 73/40, 40.5 R, 73/49.7, 118.1; 123/518, 519, 520; 702/51

(56) References Cited

U.S. PATENT DOCUMENTS

| | | | | | |
|---|---|---|---|---|---|
| 4,862,856 | A | * | 9/1989 | Yokoe et al. | 123/519 |
| 5,056,493 | A | * | 10/1991 | Holzer | 123/518 |
| 5,080,078 | A | * | 1/1992 | Hamburg | 123/521 |
| 5,632,252 | A | * | 5/1997 | Hyodo et al. | 123/520 |
| 5,647,332 | A | * | 7/1997 | Hyodo et al. | 123/519 |
| 5,687,697 | A | * | 11/1997 | Ishikawa | 123/520 |
| 5,806,500 | A | * | 9/1998 | Fargo et al. | 123/520 |
| 5,979,419 | A | * | 11/1999 | Toyoda | 123/520 |
| 6,161,423 | A | * | 12/2000 | Okuma | 73/40 |
| 6,237,574 | B1 | * | 5/2001 | Jamrog et al. | 123/519 |
| 6,253,743 | B1 | * | 7/2001 | Hyodo et al. | 123/520 |
| 6,308,692 | B1 | * | 10/2001 | Ishikawa et al. | 123/519 |
| 6,550,315 | B2 | * | 4/2003 | Streib | 73/49.7 |

FOREIGN PATENT DOCUMENTS

| | | |
|---|---|---|
| JP | 11343927 | 12/1999 |
| JP | 2001012319 | 1/2001 |

* cited by examiner

*Primary Examiner*—Helen Kwok
*Assistant Examiner*—C D Garber
(74) *Attorney, Agent, or Firm*—Nixon & Vanderhye P.C.

(57) ABSTRACT

A fuel vapor purge system has a canister and a pump on a purge line arranged between the canister to the intake passage. The system further has a sub-canister on a branch passage of the purge line. The pump is driven when the engine is stopped, and reduces an inside pressure of the system. The vapor discharged from the pump is adsorbed in the sub-canister, therefore, no vapor is emitted to the atmosphere. The controller checks a leak by monitoring the inside pressure after the inside pressure is reduced. It is possible to improve an accuracy of the leak detection since a leak check is executed when the engine is stopped.

6 Claims, 3 Drawing Sheets

LEAK CHECK APPARATUS FOR FUEL VAPOR PURGE SYSTEM

CROSS REFERENCE TO RELATED APPLICATION

This application is based on Japanese Patent Application No. 2001-104999 filed on Apr. 3, 2001 the contents of which are incorporated herein by reference.

BACKGROUND OF THE INVENTION

1. Field of the Invention

The present invention relates to a leak check apparatus for a fuel vapor purge system. The apparatus detects a leak on a fuel vapor purge system including a fuel tank.

2. Description of Related Art

In a Conventional fuel vapor purge system, a canister communicates with a fuel tank via a gas line that introduces an evaporated fuel vapor (referred to as a vapor) from the fuel tank to the canister. The vapor is adsorbed in the canister. The canister also communicates with the atmosphere via an intake line with a canister close valve (referred to as a canister valve). The canister also communicates with an intake passage via a purge-line with a purge control valve (referred to as a purge valve). Further, a controller is provided for operating the valves to adsorb the vapor in the canister and to desorb an adsorbed vapor into the intake passage. The controller also operates the valves to detect a leak on the system including the fuel tank and pipes providing the lines. The controller opens the purge-valve and closes the canister valve when an engine runs and an intake pressure is a negative pressure. Then, the controller closes the purge-valve when an inside pressure in the fuel tank reaches to a predetermined negative pressure. The controller monitors the inside pressure and detects the leak based on a variation of the inside pressure or an elapsed time until the inside pressure decreases to a specific pressure.

However, in the conventional system, since the leak check procedure is executed during the engine is running, unstable fuel level that may wave due to a vibration of the engine or a vehicle affect a leak check accuracy. Further, since the negative pressure should be introduced into the system in a short period of time, the engine may supply an excessive amount of vapor that may make an exhaust emission worse.

SUMMARY OF THE INVENTION

It is an object of the present invention to reduce an emission during a leak check procedure is executed.

It is another object of the present invention to improve an accuracy of a leak check of a fuel vapor purge system.

According to a first aspect of the present invention, an apparatus includes at least one valve which defines a closed space including a fuel tank, a main canister and at least a part of a purge passage. This closed space is subject to a leak check. A pump is disposed for discharging gaseous component in the closed space and for reducing an inside pressure of the closed space. A sub canister disposed in series to the pump which adsorb the vapor in the gaseous component discharged by the pump. Therefore, an emission of the vapor is reduced. A sensor is disposed for outputting a signal indicative of a leak on the closed space. Therefore, it is possible to detect the leak on the closed space with no significant increase of emission of the vapor.

The leak check procedure executed by using the components of the apparatus may be executed when the engine is stopped. According to this arrangement, it is possible to improve accuracy of the leak check.

According to another aspect of the present invention, an apparatus has at least one valve which defines a closed space including the fuel tank, the main canister and at least a part of the purge passage, and connects at least the remaining part of the purge passage to the intake passage of the engine. A pump is disposed on the system for pressurizing the closed space when the engine is stopped. A first sensor is disposed on the system for outputting a signal indicative of a leak on the closed space. Therefore, it is possible to detect the leak on the closed space while the engine is stopped. The apparatus further comprises a second sensor disposed on the engine which outputs a signal indicative of a leak on the remaining part of the purge passage when the engine is running. Since the remaining part of the purge passage is connected to the intake passage of the engine by the valve, a condition of the engine is influenced by the leak, and the sensor detects the condition. Therefore, it is possible to detect the leak on the remaining part. Further, a fluctuation caused by a wave on the fuel level does not affect on the leak check for the remaining part since the fuel tank is subject to the leak check while the engine is stopped.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
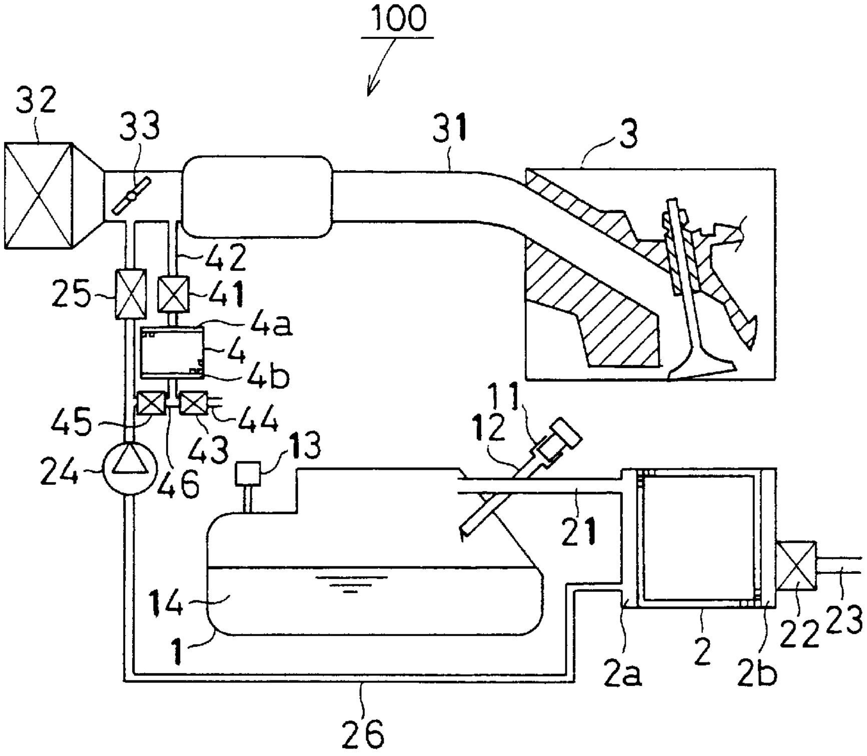
FIG. 1 is a block diagram showing a fuel vapor purge system according to a first embodiment of the present invention.
Figure 2:
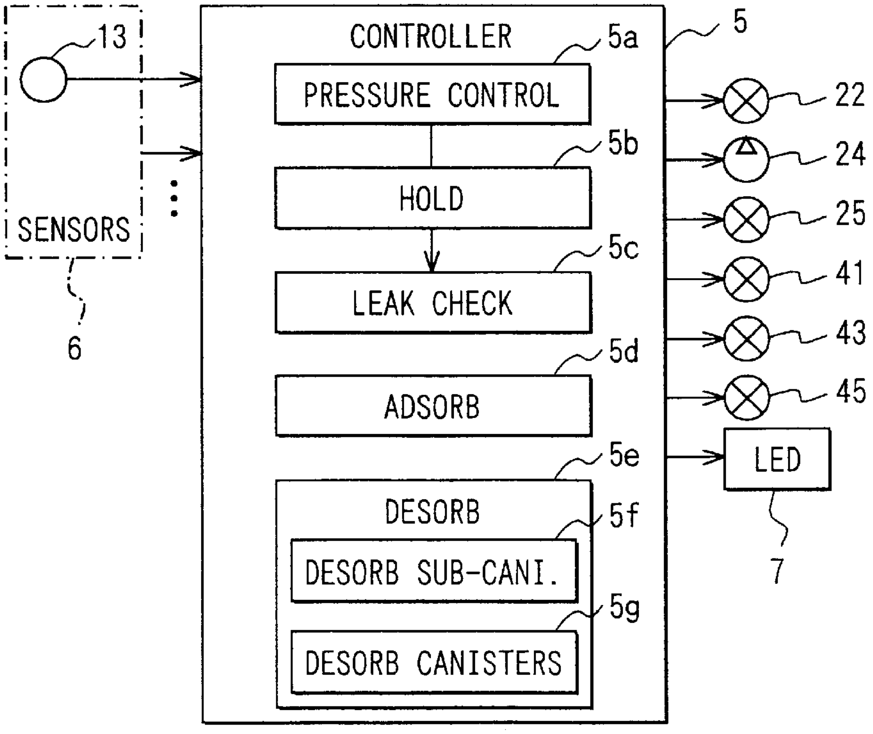
FIG. 2 is a block diagram of a controller according to the first embodiment of the present invention.

A first embodiment of the present invention is explained with reference to the drawings. In the embodiment, the present invention is applied to a fuel vapor purge system for a vehicle. FIGS. 1 and 2 show the fuel vapor purge system with a leak check apparatus for checking a leak on the fuel vapor purge system. FIG. 1 mainly shows an arrangement of the fuel vapor purge system. FIG. 2 mainly shows an arrangement of a controller that provides the fuel vapor purge system and the leak check apparatus.

Referring to FIG. 1, the system 100 is disposed between an intake system and a fuel system of an engine 3. The engine 3 has an intake passage 31. The intake passage has an air cleaner 32 and a throttle valve 33. The throttle valve 33 is operated in accordance with an operating degree of an accelerator (not shown).

The system 100 has a fuel tank 1 that has a filler tube 12 with filler cap 11. The fuel tank 1 contains fuel 14 therein.

A pressure sensor 13 is disposed on an upper portion of the fuel tank 1 to detect an inside pressure in the fuel tank 1.

The system 100 has a main canister 2, a sub-canister 4, a purge pump 24, valves 22, 25, 41, 43 and 45, and connecting pipes for providing a plurality of communicating lines. A main canister 2 has an adsorbent housed in a housing. The housing has a first end 2*a* and a second end 2*b* separated by the adsorbent. The first end 2*a* communicates with the fuel tank 1 via a gas line 21. The first end 2*a* is also communicates with the intake passage at a downstream side of the throttle valve 33 via purge line 26. A purge pump 24 and a purge valve 25 are disposed on the purge line 26 in this order from the main canister 2. The second end 2*b* communicates to the atmosphere through an intake-line 23 in which a canister valve 22 is disposed.

The sub-canister 4 which has a smaller capacity than the main canister 2 is disposed so as to bypass the purge valve 25 and to be connected in series to the pump 4 when the purge valve 25 is closed. The sub-canister 4 has an adsorbent housed in a housing that has a first end 4*a* and a second end 4*b*. The first end 4*a* communicates with the intake passage 31 via a sub-purge line 42 in which a sub-purge valve 41 is disposed. The second end 4*b* communicates with a line between the purge pump 24 and the purge valve 25 via a leak check line 46 in which a leak check valve 45 is disposed. The second end 4*b* also communicates with the atmosphere via a sub-intake line 44 in which a sub-canister valve 43 is disposed. The lines 42 and 46, and the sub-canister 4 provides a branch path to the intake passage 31. In this embodiment, the valves are open-close type electromagnetic valve. The sub canister 4 may be disposed on the suction side of the pump 4 for adsorbing the vapor in gaseous component discharged by the pump 4. It is also effective to dispose the sub canister 4 even if a leak check procedure is executed when the engine is running.

Referring to FIG. 2, a controller 5 is provided to control the valves 22, 25, 41, 43, and 45, the pump 24, and a LED 7 as a warning device. The controller 5 inputs sensor signals indicative of operating condition of the engine and the vehicle detected by a plurality of sensors 6 including the pressure sensor 13. The controller 5 provides a purge control that includes an adsorbing control 5*d* for adsorbing the vapor into at least one of the canisters 2 and 4, and a desorbing control 5*e* for desorbing an adsorbed vapor into the intake passage 31. The controller 5 further provides a leak check control procedure including for checking and detecting a leak on the system. The controller 5 activates the LED 7 if the leak is detected. A separated controller may provide the purge control. In this embodiment, the valves 22, 25, and 41 are provided for defining a closed space that includes at least the fuel tank 1, the main canister 2 and a part of a purge passage provided by the lines 21, 23, 26, 46, and 43. The pump 24 is provided for discharging gaseous component in the system and for reducing an inside pressure of the closed space.

In the adsorbing control 5*d*, the controller 5 outputs control signals to the valves and the pump so as to introduce the vapor from the fuel tank 1 to the canister 2.

In the desorbing control 5*e*, the controller 5 outputs control signals to the valves and the pump so as to introduce fresh air into the canisters and purge the adsorbed vapor in the canisters. In this embodiment, the desorbing control 5*e* is executed when the engine is running. Preferably, the desorbing control 5*e* is executed when a downstream side of the throttle valve 33 is maintained in a negative pressure. The negative pressure is usually obtained when the throttle valve 33 is almost closed.

In this embodiment, the controller provides two desorbing controls 5*f* and 5*g*. In a desorbing control 5*f* for the sub-canister 4, the controller 5 closes the purge valve 25, opens the sub-purge valve 41, closes the leak check valve 45, and opens the sub-canister valve 43. As a result, the adsorbed vapor in the sub-canister 4 is desorbed and purged into the intake passage 31 by fresh air introduced into the sub-canister 4 via the sub-intake line 44. In a desorbing control 5*g* for the canister 2, the controller 5 opens the purge valve 25, closes the sub-purge valve 41, opens the leak check valve 45, closes the sub-canister valve 43 and opens the canister valve 22. As a result, the adsorbed vapor in the canister 2 is desorbed and purged into the intake passage 31 by fresh air introduced into the system via the intake line 23. In this embodiment, the pump 24 communicates its suction and discharge side when the pump 24 is not driven, therefore the pump 24 allows airflow therethrough. The controller 5 additionally drives the pump 24 to introduce fresh air when a sufficient negative pressure is not obtained in the intake passage due to a widely opened throttle valve 33 or the like.

The controller 5 executes the leak check procedure when the engine is stopped. First, the controller 5 executes a pressure control 5*a* for reducing an inside pressure of the system. In the pressure control, the controller 5 outputs control signals to the valves and the pump to control a pressure in the system. The controller 5 closes the purge valve 25, opens the sub-purge valve 41, opens the leak check valve 45, closes the sub-canister valve 43, closes the canister valve 22 and drives the pump 24. As a result, air and the vapor in the fuel tank 1, the gas line 21, the canister 2, and the purge line 26 from the canister 2 to the pump 24 is discharged to the intake passage 31 through the sub-canister 4. During the pressure control 5*a*, the pump 24 discharges a certain volume of gas into the intake passage 31 while the engine 3 is stopped. However, the vapor is adsorbed in the sub-canister 4, and is not emitted to the atmosphere. The controller 5 monitors the inside pressure detected by the pressure sensor 13, and determined whether or not the inside pressure is decreased to a predetermined negative pressure. If the inside pressure is decreased to the predetermined negative pressure, the controller 5 executes a holding control 5*b* by closing the sub-purge valve 41 and stopping the pump 24. Then, the controller 5 executes a leak check control 5*c* by monitoring the inside pressure detected by the pressure sensor 13. In the leak check control 5*c*, the controller 5 detects a variation of the inside pressure within a predetermined time period, and determined that whether or not the detected variation indicates the leak on system components. The controller 5 may detects a time indicative of the leak, e.g. duration until the inside pressure increases to the predetermined pressure, instead.

According to the embodiment described above, it is possible to detect the leak accurately, since the embodiment executes the leak check procedure while the engine is stopped.

Figure 3:
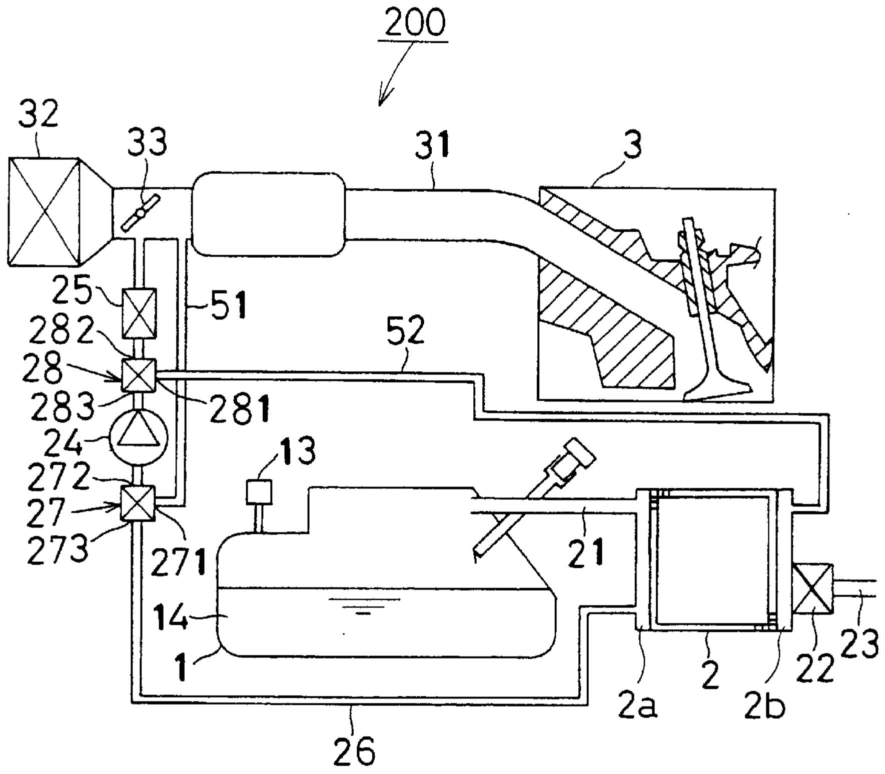
FIG. 3 is a block diagram of a fuel vapor purge system according to a second embodiment of the present invention.
Figure 4:
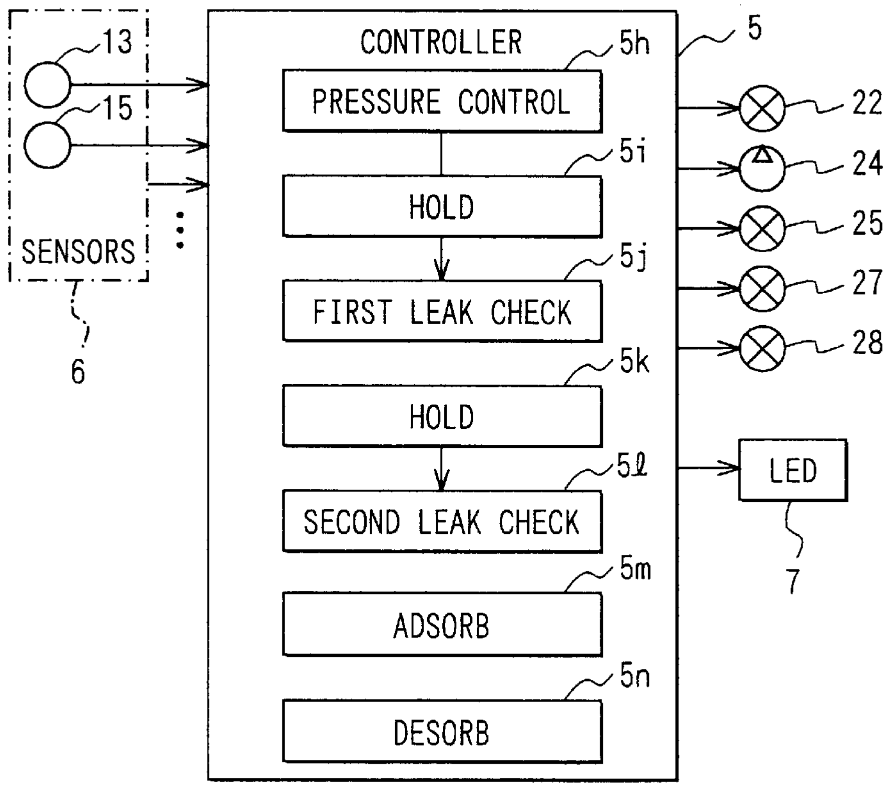
FIG. 4 is a block diagram of a controller according to the second embodiment of the present invention.

FIGS. 3 and 4 show a second embodiment of the present invention. In this embodiment the same reference numbers are used for the same or equivalent components as the first embodiment to eliminate repeated descriptions. The system 200 has lines 51, and 52, and three-port valves 27 and 28 instead of the components 4, 41, 42, 43, 44, 45, 46 utilized in the first embodiment. A first three-port valve 27 is disposed on a suction side of the pump 24. The first three-port valve has three ports 271, 272, and 273, and selectively connects the port 272 to the port 271 or the port 273. A second three-port valve 28 is disposed between the pump 24 and the purge valve 25. The three-port valve 28 has three ports 281, 282, and 283, and selectively connects the port 283 to the port 281 or the port 282. The second end 2*b* of the canister 2 communicates with the port 281 of the second three-port valve 28 via a pressurizing line 52. The port 271 of the first three-port valve 27 communicates with the intake passage 31 via a suction line 51. The controller 5 inputs a signal from an oxygen sensor 15 disposed in an exhaust passage for detecting an oxygen amount in the exhaust passage.

The controller 5 provides two leak check procedures. The controller 5 executes a first leak check procedure when the engine is stopped. First, the controller 5 executes a pressure control 5*h*. In the pressure control 5*h*, the controller 5 closes the canister valve 22, drives the first three-port valve 27 so as to connect the first port 271 and the second port 272, drives the second three-port valve 28 so as to connect the first port 281 and the third port 283, and drives the pump 24. As a result, the pump 24 introduces air from the intake passage 31 into the system through the canister 2. The controller 5 monitors the inside pressure detected by the pressure sensor 13, and determines whether or not the inside pressure is increased to a predetermined positive pressure. If the inside pressure is increased to the predetermined pressure, the controller 5 executes a holding control 5*i* by stopping the pump 24, and driving the first three-port valve 27 so as to connect the second port 272 and the third port 273. Therefore, the fuel tank 1, the canister 2, the line 52 and the line 26 from the canister 2 to the second three-port valve 28 form a closed space. Then, the controller 5 executes a first leak check control 5*j* by monitoring the inside pressure and determines whether or not a variation of the inside pressure indicates the leak on the components. For instance, the controller 5 detects a decreased amount of the inside pressure in a predetermined time, and detects the leak if the detected decreased amount is greater than a predetermined mount. Alternatively, the controller 5 may detects duration until the inside pressure decreases to a predetermined pressure, and detects the leak if the detected duration is shorter than a predetermined duration. The controller 5 opens the canister valve 22 to release the pressurized inside pressure to the atmosphere through the canister 2 when the first leak check procedure is completed. Therefore the vapor in the closed space is adsorbed in the canister 2 at the end of the first leak check procedure.

The controller 5 executes a second leak check procedure when the engine is running and the throttle valve is almost closed. First, the controller 5 executes a holding control 5*k*. In the holding control 5*k*, the controller 5 opens the purge valve 25, drives the first three-port valve 27 so as to connect the first port 271 and the second port 272, drives the second three-port valve 28 so as to connect the second port 282 and the third port 283, and drives the pump 24. Therefore, the line 51 and a part of the line 26 from the first three-port valve 27 to the intake passage 31 are connected to the intake passage 31. The line 51 and a part of the line 26 from the first three-port valve 27 to the intake passage 31 are the remaining part of the passage of the system that is not inspected by the above described first leak check procedure. The controller 5 monitors the signal from the oxygen sensor 15, and determines that whether or not the signal indicates the leak. For instance, if the leak exists on the components 51, 27, 24, 28, 25 and 26, the signal from the oxygen sensor 15 indicates an excessive oxygen amount.

The controller 5 executes an adsorbing control 5*m* by controlling the valves and the pump so as to introduce the vapor into the canister 2.

The controller executes a desorbing control 5*n* when the engine is running. The controller 5 opens the canister valve 22, drives the first three-port valve 27 so as to connect the second port 272 and the third port 273, and drives the second three-port valve 28 so as to connect the second port 282 and the third port 283. As a result, the adsorbed vapor in the canister 2 is desorbed and purged into the intake passage 31. The controller 5 additionally drives the pump 24 if the negative pressure is insufficient due to an operating condition of the engine.

According to the second embodiment, main components of the system 200 are subject to the leak check while the engine 3 is stopped. Therefore, it is possible to detect the leak accurately without an influence of waving fuel level. Further, the remaining components including at least a part of the purge line is subject to the leak check while the engine 3 is running.

Figure 5:
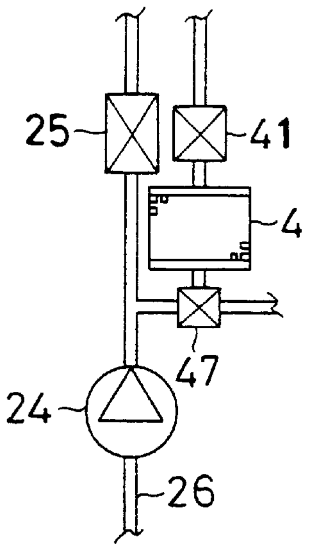
FIG. 5 is a block diagram showing a part of a fuel vapor purge system according to a third embodiment of the present invention.

FIG. 5 shows a third embodiment of the present invention. FIG. 5 shows a partial arrangement of the system. In the third embodiment, a three-port valve 47 is used instead of the valves 43 and 45 in the first embodiment.

Figure 6:
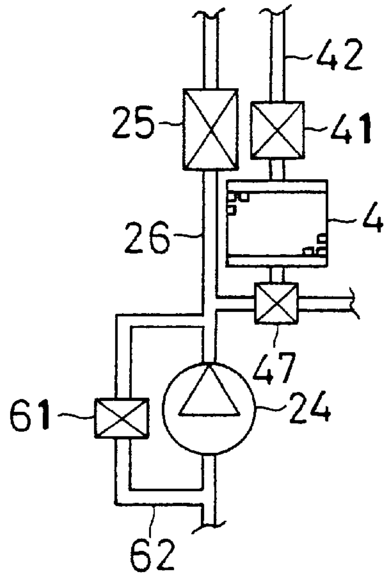
FIG. 6 is a block diagram showing a part of a fuel vapor purge system according to a fourth embodiment of the present invention.

FIG. 6 shows a fourth embodiment of the present invention. In this embodiment, the pump 24 doesn't communicate a suction side and a discharge side when the pump is stopped. A bypass line 62 and a valve 61 are added in a bypassing manner to communicate the suction side and the discharge side of the pump 24. The controller 5 controls the valve 61 so that the bypass line 62 communicates the suction side and the discharge side when the pump 24 is stopped. This arrangement may apply to either the first and second embodiment.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A leak check apparatus for a fuel vapor purge system having a fuel tank, a main canister for adsorbing fuel vapor in the fuel tank and a purge passage for purging the adsorbed vapor to an intake passage of an engine, the apparatus comprising:

at least one valve which defines a closed space including the fuel tank, the main canister and at least a part of the purge passage;

a pump which discharges gaseous component in the closed space for reducing an inside pressure of the closed space;

a sub canister disposed in series to the pump which adsorb the vapor in the gaseous component discharged by the pump; and a sensor which outputs a signal indicative of a leak on the closed space.

2. The leak check apparatus according to claim 1, further comprising a controller that includes:

means for controlling the valve to provides the closed space;

means for controlling the pump to reduce the inside pressure to a predetermined pressure; and means for detecting the leak based on the signal detected by the sensor.

3. The leak check apparatus according to claim 2, wherein the main canister has a first end and a second end separated by an adsorbent, and wherein the sub canister has a first end and a second end separated by an adsorbent, and wherein the purge passage includes:

a gas line that communicates the first end of the main canister and the fuel tank;

a purge line that communicates the first end of the main canister and the intake passage of the engine;

an intake line that communicates the second end of the main canister and the atmosphere;

a sub purge line that communicates the first end of the sub canister and the intake passage of the engine;

a leak check line that communicates the second end of the sub canister and the purge line; and a sub intake line that communicates the second end of the sub canister and the atmosphere, and wherein the valve includes:

a canister valve disposed on the intake line;

a purge valve disposed on the purge line;

a sub purge valve disposed on the sub purge line;

a sub canister valve disposed on the sub intake line; and a leak check valve disposed on the leak check line, and wherein the pump and the purge valve are disposed in the purge line in series and wherein the leak check line is connected to between the pump and the purge valve, and wherein the means for controlling the valve includes;

first means for controlling the valves before reducing the inside pressure, so as to close the purge valve, open the sub purge valve, open the leak check valve, close the sub canister valve and close the canister valve; and second means for controlling the valves after reducing the inside pressure, so as to close the purge valve, close the sub purge valve, open the leak check valve, close the sub canister valve and close the canister valve, and wherein the means for detecting the leak detects the leak after the second means closes the sub purge valve.

4. The leak check apparatus according to claim 3, wherein the controller further comprises:

means for purging the sub canister when the engine is running, by closing the purge valve, opening the sub purge valve, closing the leak check valve, and opening the sub canister valve; and means for purging the main canister when the engine is running, by opening the purge valve, closing the sub purge valve, and opening the canister valve.

5. The leak check apparatus according to claim 3, wherein the sensor is a pressure sensor disposed on the closed space to detect the inside pressure, and wherein the means for detecting the leak detects the leak based on a characteristic of a pressure variation detected by the pressure sensor such as a pressure variation in a predetermined time or duration until the inside pressure reaches to a predetermined pressure.

6. The leak check apparatus according to claim 1, wherein the pump discharges the gaseous component in the closed space when the engine is stopped.

* * * * *